United States Patent [19]
Sugiyama

[11] Patent Number: 5,253,075
[45] Date of Patent: Oct. 12, 1993

[54] IMAGE SIGNAL CODING/DECODING SYSTEM USING ADAPTIVE QUANTIZATION

[75] Inventor: Kenji Sugiyama, Yokosuka, Japan

[73] Assignee: Victor Company of Japan, Ltd., Yokohama, Japan

[21] Appl. No.: 766,950

[22] Filed: Sep. 30, 1991

[30] Foreign Application Priority Data

Sep. 29, 1990 [JP] Japan .................. 2-262389
Aug. 30, 1991 [JP] Japan .................. 3-245008

[51] Int. Cl.$^5$ .............................. G06K 9/36
[52] U.S. Cl. .................. 358/261.2; 358/433
[58] Field of Search .............. 358/261.1–261.4, 358/262.1, 426–427, 429, 433; 382/56

[56] References Cited

U.S. PATENT DOCUMENTS

| | | | |
|---|---|---|---|
| 4,760,460 | 7/1988 | Shimotohno | 358/261.2 |
| 5,051,840 | 9/1991 | Watanabe et al. | 358/433 |
| 5,060,285 | 10/1991 | Dixit et al. | 358/433 |
| 5,093,872 | 3/1992 | Tutt | 358/433 |

Primary Examiner—Stephen Brinich
Attorney, Agent, or Firm—Jacobson, Price, Holman & Stern

[57] ABSTRACT

An image signal coding/decoding system comprises an encoder for encoding an image signal by using the adaptive quantization, and a decoder for decoding the coded image signal by using the adaptive inverse-quantization. The encoder comprises an activity detection element for detecting, every blocks obtained by dividing an image signal every a specific time length, activities indicating degree of changes in the signal in the respective blocks; a quantization class determination element for determining class values of a plurality of quantization classes set in correspondence with respective stages of the adaptive quantization from the detected activities; and for outputting the determined class values as class information to the decoder, a filter element for filtering not only the class values but also class values at the peripheral blocks; and a quantization step width determination element for determining, every blocks, widths of quantization steps corresponding to a value obtained by multiplying these class values by fixed coefficients on the basis of class values subjected to filtering. The decoder comprises a decode element for decoding coded data transmitted from the encoder by using the variable-length codes, and an inverse-quantization element for inverse-quantizing the variable-length decoded signal on the basis of class information transmitted from the quantization class determination element.

11 Claims, 6 Drawing Sheets

FIG. 12 (a)
FIG. 12 (b)
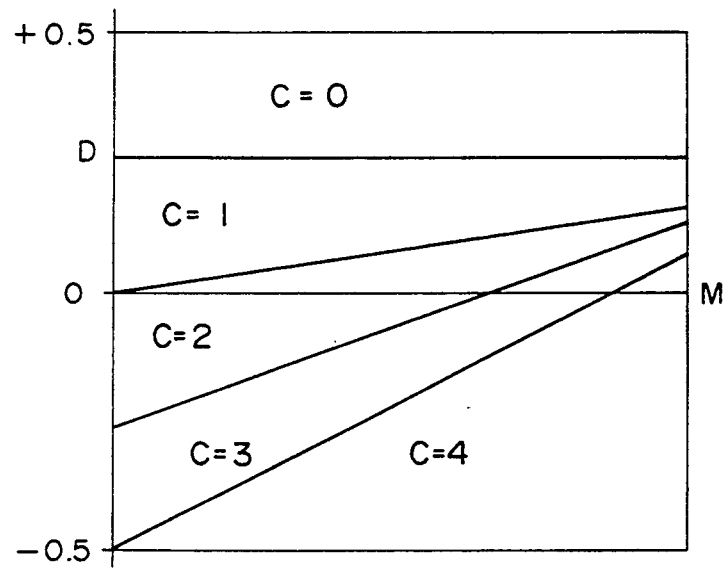
FIG. 13
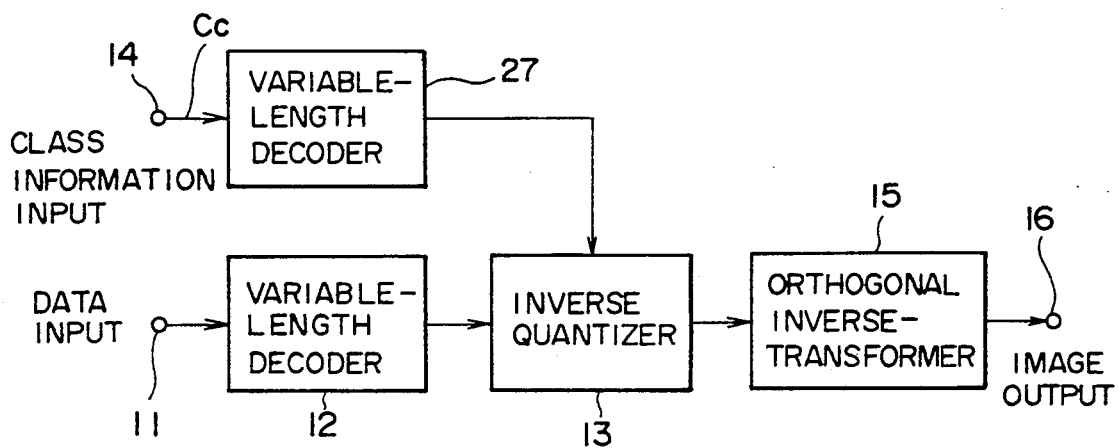
FIG. 14

IMAGE SIGNAL CODING/DECODING SYSTEM USING ADAPTIVE QUANTIZATION

BACKGROUND OF THE INVENTION

This invention relates to an image signal coding/decoding system, and more particularly to an efficient coding system applied to a recording/transmission/display device for carrying, out the processing of an image signal to digitize an image signal by less quantity of data, especially to an image signal coding/decoding system using the adaptive quantization.

Generally, in the efficient coding for an image signal, there is known an adaptive quantization in which an image signal is divided into block units to vary the step width for quantization at every block unit, in accordance with degree of the change of a signal of several blocks (hereinafter referred to as activity). It is generally well-known that a quantization error is difficult to be detected visually by human beings in the portion where the change of a signal is large, and easy to be detected in the portion where the change of a signal is little. Therefore, the step for quantization becomes broad (coarse) in the block having high activity (large change of signal), and the step for quantization becomes narrow (fine) in the block having low activity (little change of signal), thereby performing an adaptive quantization.

In the coding technique using the orthogonal transformation, an image frame is generally transformed by the block of "8×8" pixels, for example, and the coefficients generated by the transformation are quantized by the same pixel unit.

Since such an adaptive quantization requires transmission of information for adaptive processing to the decoder side, if there are many kinds of the adaptive processing by the activity, a large quantity of information would have to be transmitted.

In view of this, an approach is typically employed to set the kinds of the adaptive processing to approximately four. A quantization class mentioned here refers to a value at an intermediate stage where the quantization step is determined from the activity.

FIG. 1 is a block diagram showing the system configuration of a conventional image signal encoder. In FIG. 1, an image signal input from the image input terminal 1 is delivered to an orthogonal transformer 2.

The orthogonal transformer 2 carries out orthogonal transformation of an input signal by the technique such as the discrete cosine transformation (DCT), etc., for every block of "8×8" pixels. From the orthogonal transformer 2, two kinds of transformation coefficients are output. One is the DC coefficient indicating a mean value of blocks, and the other is the AC coefficient indicating the manner of changes. These coefficients are delivered to an adaptive quantizer 3.

The adaptive quantizer 3 quantizes respective coefficients that are orthogonally transformed, in accordance with the method which will be described later, by the step width where respective coefficients are set to deliver the quantized information to a variable-length encoder 4. To speak generally, the adaptive quantization is such a quantization system to vary the quantization method in dependency upon the property of an image. In this example, the step width for quantization is changed by the result after the block activity is obtained by the method which will be described later on the basis of the orthogonal transform coefficient.

The variable-length encoder 4 carries out variable-length coding of the quantized transform coefficients, thereby supporting them to the decoder through the data output terminal 5. In this case, since the AC coefficient concentrate on the value in the vicinity of "0", by setting variable-length code of the AC coefficient so that the code length of "0" is the shortest, and that the code length becomes large according as the absolute value becomes large, the quantity of data quantity can be reduced.

On the other hand, the transform coefficients which are generated by the orthogonal transformer 2 are also delivered to an activity detector 6. The activity detector 6 determines the sum of the absolute values of AC coefficients of respective blocks to deliver the determined result to a quantization class determination element (determinator) 7 as an activity value A for every block.

The quantization class determinator 7 determines a class value C for quantization based on the activity value A. This class value C is an index for determining an actual step width of the quantization, and the value C consists of, in the example as shown in FIG. 2, four kinds of values of 0, 1, 2, and 3, and is incremented by one every time the activity value A doubles. While there results a more preferable characteristic as the number of classes increases, more classes require more information to be transmitted, while it is impossible to increase the number of classes beyond a certain unit.

Information outputted from the quantization class determinator 7 is transmitted to the decoder side through the class information output terminal 8, and is also delivered to the adaptive quantizer 3.

The manner of the adaptive quantization will now be described with reference to the waveform diagrams of FIGS. 3(a), 3(b) and 3(c). FIG. 3(a) shows a signal waveform before transformation, FIG. 3(b) shows an activity value A, and FIG. 3(c) shows a quantization step width Sq.

The signal waveform of an image signal before transformation shown in FIG. 3(a) specifically shows the portion in the vicinity of the boundary portion between the flat portion where there is no change to much extent and the portion where there are changes. Since the activity value A is small at the flat portion and is large at the changing portion, the activity value A becomes large at the boundary block as shown in FIG. 3(b). Since the adaptive quantization is carried out as it is as in the conventional system, as shown in FIG. 3(c), the quantization step width Sq varies a great extent between blocks.

In the encoded signals by the orthogonal transform, a quantization error is diffused into the signals in the block when image data are inversely transformed at the decoder. Accordingly, a quantization error of the edge portion will extend up to the periphery of the edge portion in the block including the edge portion of an image. This phenomenon is called a mosquito noise. By this noise, the picture quality would be deteriorated visually.

Furthermore, when the adaptive quantization is carried out, since the block having the above-mentioned edge portion has a high activity, the quantization becomes coarse, resulting in an increase in the quantization noise, i.e., the mosquito noise is increased. In this case, as the block for the adaptive quantization becomes small, more appropriate processing is carried out. However, since information of the quantization class is required to be transmitted every block, if the block becomes small to a great degree, a quantity of data therefor is increased, resulting in the inconvenience that transmission is not properly conducted. A further problem is that the number of the quantization class cannot be increased to a great degree for the same reason that the number of blocks cannot be substantially decrease. Accordingly, in the conventional transform encoder, it was considered that the adaptive quantization is difficult to be applied.

In addition, if an attempt is made to carry out the adaptive quantization so that it is adapted to the visual characteristic, class information for the adaptive quantization would be increased, resulting in the problem that a quantity of codes generated cannot be necessarily reduced as a whole.

SUMMARY OF THE INVENTION

An object of this invention is to provide an image signal coding/decoding system in which the block correlation is used to allow the activity to be low to thereby prevent the quantization from becoming more coarse than required to provide reduction of the mosquito noise and improvement in the deterioration in the picture quality at the image edge portion, thus making it possible to carry out quantization in harmony with the visual characteristic.

Another object of this invention is to provide an image signal coding/decoding system in which an approach is employed to carry out thinning of quantization class information every specific blocks to interpolate the thinned class information by transmitted information, thereby making it possible to reduce a quantity of data to be transmitted.

A further object of this invention is to provide an image signal coding/decoding system in which an approach is employed to detect an activity to allow the quantization step to be more fine at a block having high activity, and to change class information for the adaptive quantization to variable-length coded information, thereby making it possible to carry out an improvement in the picture quality and reduction in a quantity of data to be transmitted.

To achieve the above-mentioned objects, an image signal coding/decoding system according to this invention comprises an activity detection circuit for detecting activities of respective blocks in changing the step for quantization every block, a quantization class determination circuit for determining the class value of quantization from detected activities, a filter circuit for filtering not only the quantization class value but also class values at peripheral blocks, and a step width determination circuit for determining the quantization step width from the class values subjected to filtering.

Further, between the filtering circuit and the determination circuit, there may be provided a thinning circuit for thinning the class values subjected to filtering every block, and an interpolation circuit for outputting a signal for preparing by interpolation class values of blocks lost by thinning.

Furthermore, between the activity detection circuit and the quantization class determination circuit, there may be provided a change detection circuit for detecting changes in the detected activity, thus allowing the quantization step having an activity greater than those of the peripheral blocks to be fine.

In addition, there may be provided a variable-length encoder circuit for allowing a difference value between blocks of the quantization class value determined by the determination circuit to be subjected to variable length coding.

Furthermore, a decoder for decoding information transmitted from the encoder provided with the above-mentioned variable-length encoder circuit comprises a decoder circuit for decoding information of the quantization class transmitted in the form of the variable length code, and an inverse-quantization circuit for carrying out adaptive inverse-quantization by information of the quantization class obtained by the decoder circuit.

The coding/decoding system composed of the detection circuit, the quantization class determination circuit, the filter circuit, and the step width determination circuit does not determine the quantization class for every black but determines it in a broader range so that the quantization does not become coarse at the edge portion. In actual, practice the quantization class determined every block is caused to be passed through a low-pass filter (LPF) circuit in order to allow it to have correlation between blocks. Information of the quantization classes of blocks transmitted are subjected to thinning. Thus, information of the quantization classes of blocks which are not transmitted are generated by carrying out interpolation on the basis of the quantization class information of blocks transmitted.

Since the quantization class has a correlation with that of the neighboring blocks, the class is allowed to be low at the edge portion by blocks having low class corresponding to the flat portion adjacent to the edge portion. Thus, information is adaptively quantized, so the quantization does not become coarse. Accordingly, there is no increase in the mosquito noise, etc. Thus, quantization adapted to the visual characteristic can be conducted.

Furthermore, since information of the quantization class is thinned, a quantity of data to be transmitted is reduced, and the kind of classes is increased by filtering, resulting in a smooth change.

Still furthermore, an approach is employed to detect a change between blocks of the activity to vary the quantization class by the detected change. Thus, at the edge portion or in an image existing in an isolated manner before a flat background, the activity becomes higher than those in the peripheral blocks, so quantization is finely carried out. Accordingly, the mosquito noise is reduced, so quantization in harmony with the visual characteristic is carried out.

In addition, since the classes for the adaptive quantization have strong correlation between blocks, a quantity of codes can be lessened by the variable-length coding of the difference between blocks.

As stated above, in accordance with the image signal coding/decoding system according to this invention, several advantages described below are provided.

(a) Since the class values of quantization determined by the detected activity are caused to pass through the filter circuit in order to allow them to have correlation between blocks, the activity is caused to be low at the edge portion by the adjacent block having low activity corresponding to the flat portion. Accordingly, the quantization does not become more coarse than required even by the adaptive quantization carried out subsequently thereto. As a result, there is no increase in the mosquito noise, so quantization conforming to the visual characteristic is carried out. Thus, the deterioration in the picture quality at the edge portion is greatly improved.

(b) Since an approach is employed to carry out thinning of class values, and to interpolate class values of blocks which are not transmitted by class values of transmitted blocks, thus to determine the quantization step width by the interpolated class values, the quantity of data which must be transmitted can be reduced as a whole.

(c) By employing an approach to detect changes in the activity to thereby detect the edge portion of an image to allow the quantization step at the edge portion to be more fine, the quantization of the edge portion and the isolated image in the adaptive quantization is carried out more finely. Thus, reduction of the mosquito noise and an improvement in the deterioration of the picture quality can be realized.

(d) Since a quantity of data to be transmitted can be reduced by allowing class information for the adaptive quantization to be subjected to variable-length coding, even when the number of classes is increased, if the change in the classes is not so sudden, the quantity of data is not so increased. Thus, more appropriate adaptive quantization can be carried out.

BRIEF DESCRIPTION OF THE DRAWINGS

In the accompanying drawings

FIGS. 9 and 10 are diagrams for explaining an image signal coding/decoding system according to a second embodiment of this invention wherein FIG. 9 is a block diagram showing the outline of the configuration of the encoder and FIG. 10 is a block diagram showing the outline of the configuration of the decoder;

FIGS. 12(a) and (b) are explanatory views showing in a two-dimensional manner respective tap coefficients of the LPF in the encoder of the third embodiment;

FIG. 13 is a characteristic diagram for determining the class value C** from the mean component M and the change component D of the block activity; and FIG. 14 is a block diagram showing the outline of the configuration of the decoder in an image signal coding/decoding system according to a third embodiment of this invention.

DETAILED DESCRIPTION OF THE PREFERRED EMBODIMENTS

Figure 1:
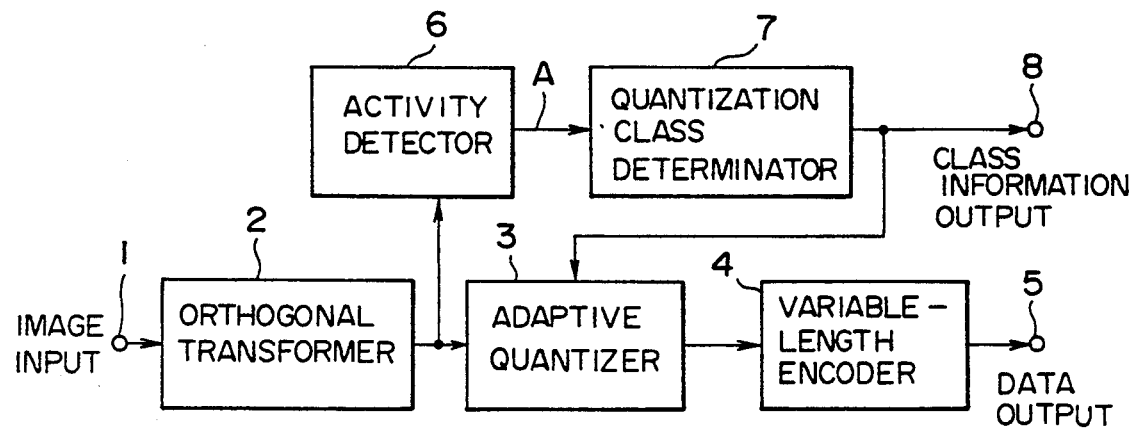
FIG. 1 is a block diagram showing the outline of the configuration of a conventional image signal coding/decoding system.
Figure 2:
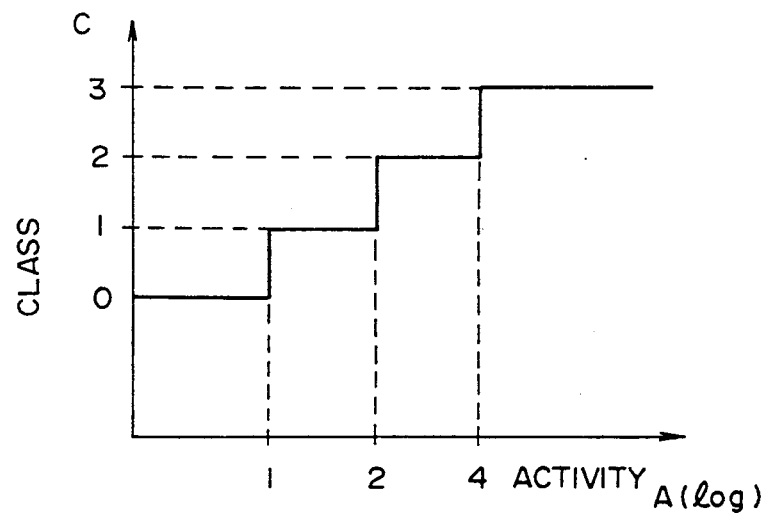
FIG. 2 is a graph showing the characteristic of the quantization class determinator of FIG. 1.
Figure 4:
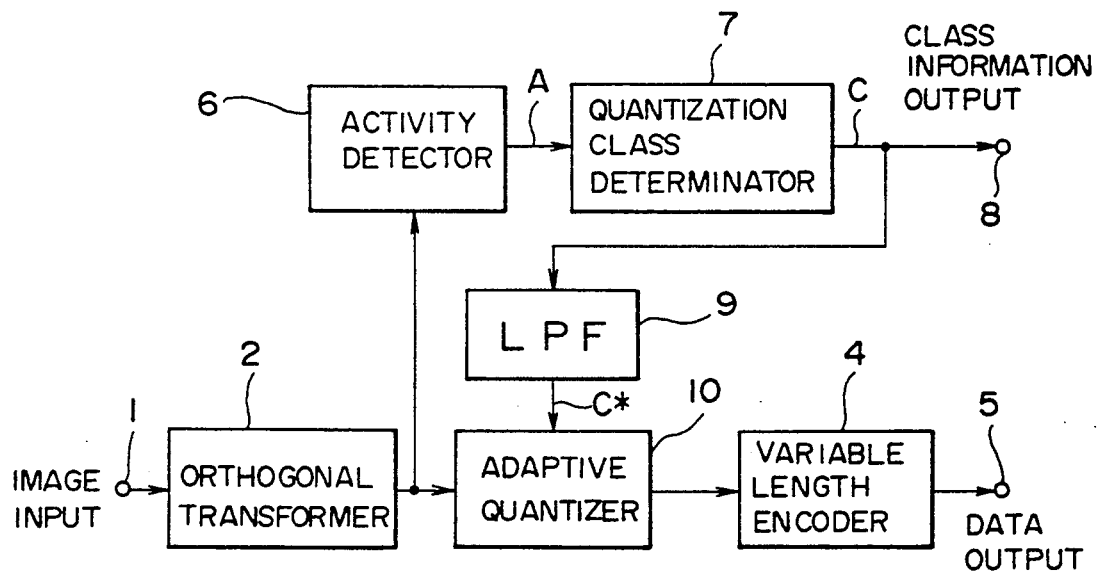
FIG. 4 is a block diagram showing the outline of the configuration of an image signal coding/decoding system according to a first embodiment of this invention.

FIG. 4 shows an encoder of an image signal coding/decoding system according to a first embodiment of this invention wherein the same reference numerals are attached to the same components of FIG. 1 showing the conventional encoder, respectively, and the repetitive explanation will be omitted.

The circuit configuration shown in FIG. 4 differs from that shown in FIG. 1 in that class information which is an output signal from quantization class determinator 7 is delivered to adaptive quantizer 10 through a low-pass filter (LPF) 9, and that the control operation in the adaptive quantizer 10 is altered.

In FIG. 4, class information which is an output signal from the quantization class determinator 7 is inputted to LPF 9, at which it is smoothed. The processing at the LPF 9 is the processing in which the processing for pixel values by an ordinary spatial LPF is replaced by the processing for class values every blocks.

Figures 5, 6:
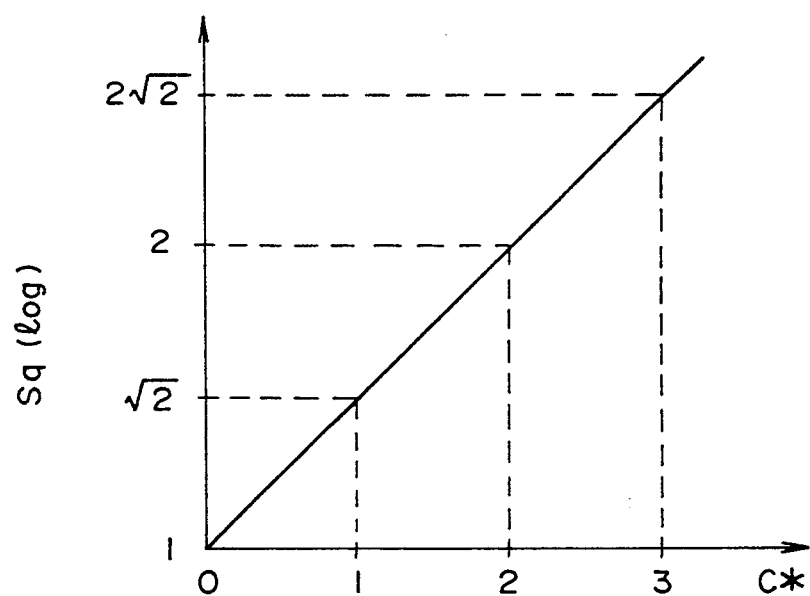
FIG. 5 is an explanatory view showing in a two-dimensional manner respective tap coefficients of the LPF in the encoder of the first embodiment.
FIG. 6 is a diagram showing the transform characteristic of the class value C* and the quantization step Sq.

FIG. 5 is a diagram representing in a two-dimensional manner respective tap coefficients of the LPF 9. By these tap coefficients, there result raised cosine type frequency characteristics both in a vertical direction and in a horizontal direction.

Here, the class value C delivered to the LPF 9 expresses four different values, but the class value C* subjected to filtering expresses a greater number of values than that. This class value C* is delivered to adaptive quantizer 10.

To speak generally, the adaptive quantizer 10 carries out quantizes the transform coefficient with the step width determined by multiplying the quantization step width Sq determined by the class value C* by the control coefficient k. The coefficient k is the coefficient for controlling quantity of data. This coefficient is determined from the external in order to keep the data quantity outputted from the encoder within the capacity of a transmission system. Accordingly, it can be said that the quantization step width Sq is a relative value for quantization. However, there will now be described the coefficient k as "k=1" in order to simplify the description.

FIG. 6 is a graph showing the transform characteristic of the quantization step width Sq versus the class value C*. In the figure, every time the class value C* is incremented by one, the quantization step width Sq is increased $\sqrt{2}$ times. Namely, every time the activity value A is increased twice, the quantization step width is increased $\sqrt{2}$ times.

Figure 7:
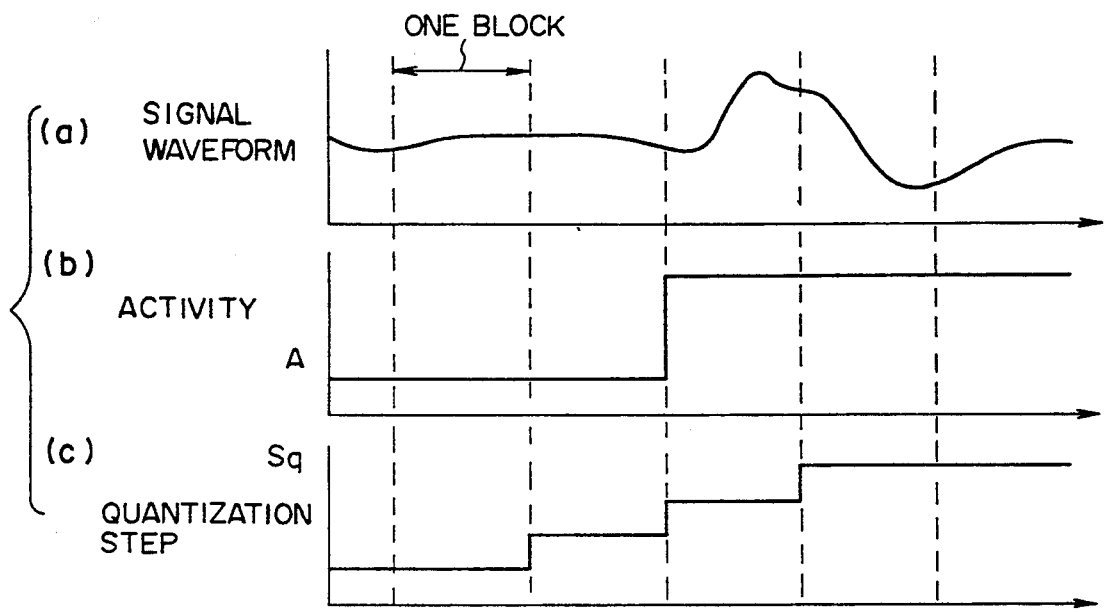
FIGS. 7(a), (b), and (c) a waveform diagram showing the manner of the adaptive quantization by the system of the first embodiment.

FIG. 7(a), (b) and (c) are waveform diagrams showing the manner of the adaptive quantization in the encoder of the first embodiment. FIGS. 7(a) and (b) correspond to FIGS. 3(a) and (b) referred to in the prior art, and represent the signal change before transformation and the activity $\underline{A}$, respectively, and FIG. 7(c) represents the quantization step width Sq.

Figure 3:
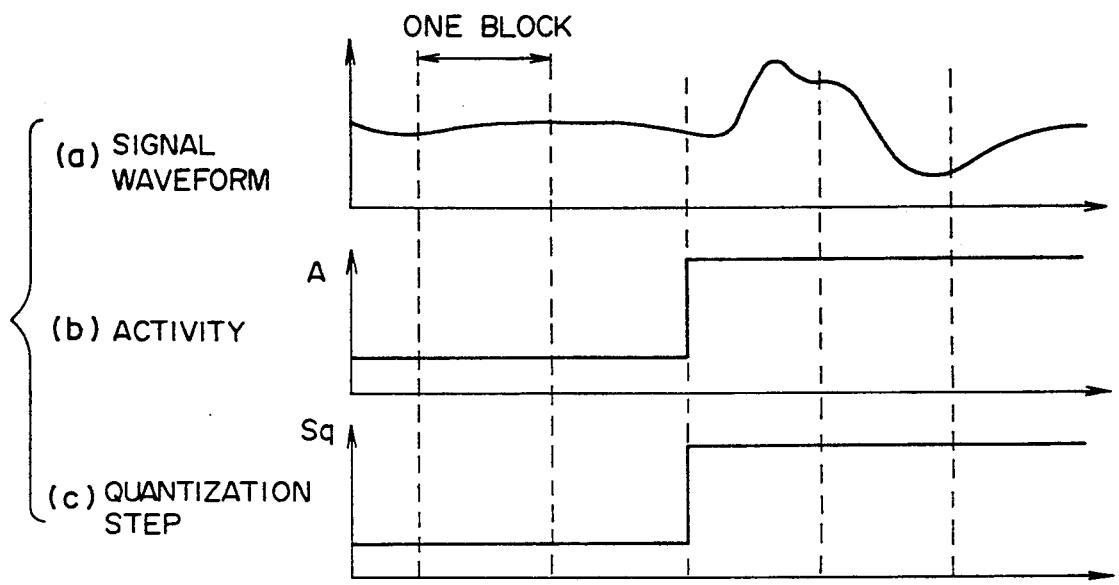
FIGS. 3(a), (b) and (c) are waveform diagrams showing the manner of the adaptive quantization in the conventional system.

The image signal waveform shown in FIG. 7(a) indicates a boundary portion between the flat portion and the changing portion in the same manner as in the case of FIG. 3(a). Since the activity $\underline{A}$ is such that it is small at the flat portion and is large at the changing portion, the activity $\underline{A}$ becomes large at the block in the vicinity of the boundary as shown in FIG. 7(b).

In the case of the conventional adaptive quantization, since the filtering processing is not implemented, the quantization step width Sq varies greatly to at the boundary block as shown in FIG. 3(a). On the contrary, in the case of the first embodiment, since filtering processing is implemented, the quantization step Sq gradually increases in the vicinity of the boundary block, and the degree of the change becomes small.

Figure 8:
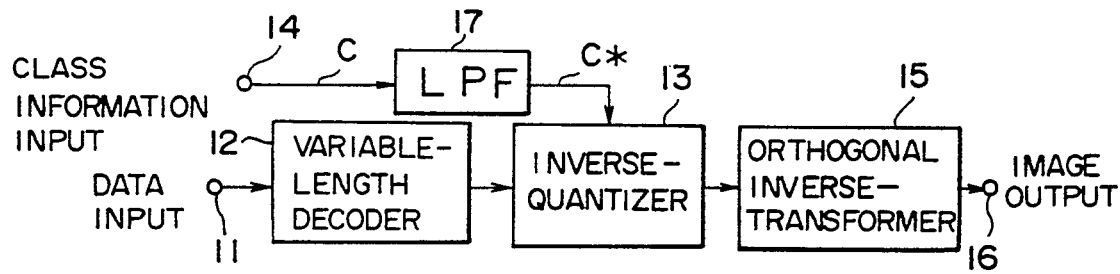
FIG. 8 is a block diagram showing the outline of the configuration of a decoder in a system according to a first embodiment of this invention.

FIG. 8 shows the outline of the configuration of a decoder in the system according to the first embodiment of this invention. In FIG. 8, compressed data transmitted through the data output terminal 5 of the encoder of FIG. 4 is delivered to an variable-length decoder 12 through the data input terminal 11. The variable length decoder 12 converts a variable length code transmitted to a normal code. The code thus obtained is delivered to an inverse-quantizer 13.

On the other hand, an input signal of class information (class $\underline{C}$) delivered through the class information output terminal 8 of the encoder shown in FIG. 4 is delivered to the inverse-quantizer 13 through an LPF 17 having the same characteristics as the LPF 9 shown in FIG. 4. This inverse-quantizer 13 replaces the ordinary code delivered from the decoder 12 by a representative value of quantization on the basis of the class $C^*$ restored by the LPF 17 to deliver the quantization representative value to the orthogonal inverse-transformer 15.

The step width for replacement is determined on the basis of the characteristic of FIG. 6 by the class value $C^*$ subjected to filtering in the same manner as in the adaptive quantizer 10 in the encoder.

The orthogonal inverse-transformer 15 allows an input signal to be converted by an Inverse Cosine Transform (Inverse-DCT) to reproduce the image signal to output this signal through the image output terminal 16.

Furthermore, since the quantization classes used in this invention have correlation with adjacent blocks by filtering, even if information of all blocks are not transmitted, substantially the same result as in the case where information of all blocks are transmitted is provided by interpolation. Namely, the reduction of transmitting data is accomplished by thinning quantization class information every several blocks, transmitting them and interpolating class values of blocks which are not transmitted as the result of thinning, from class values of blocks transmitted.

Figure 9:
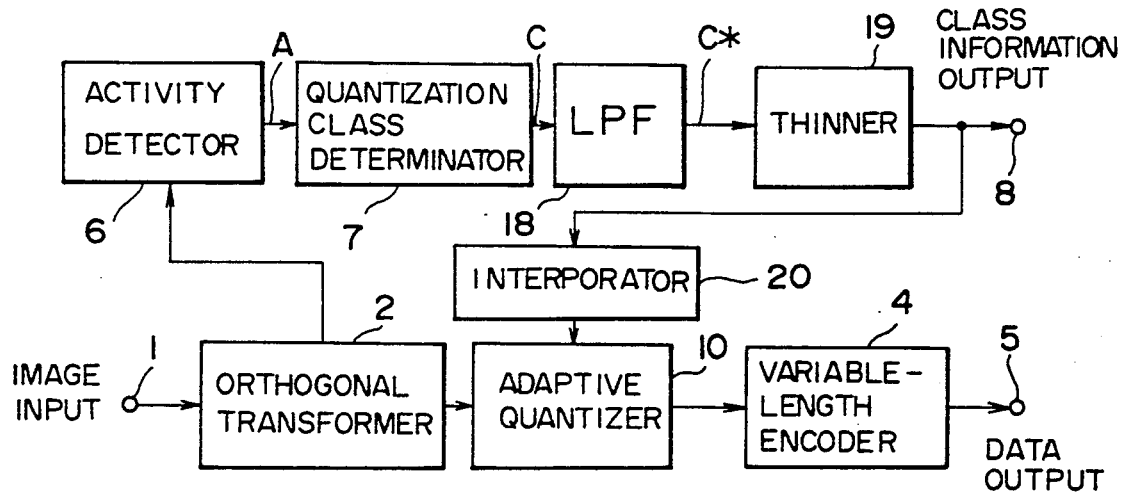
Figure 10:
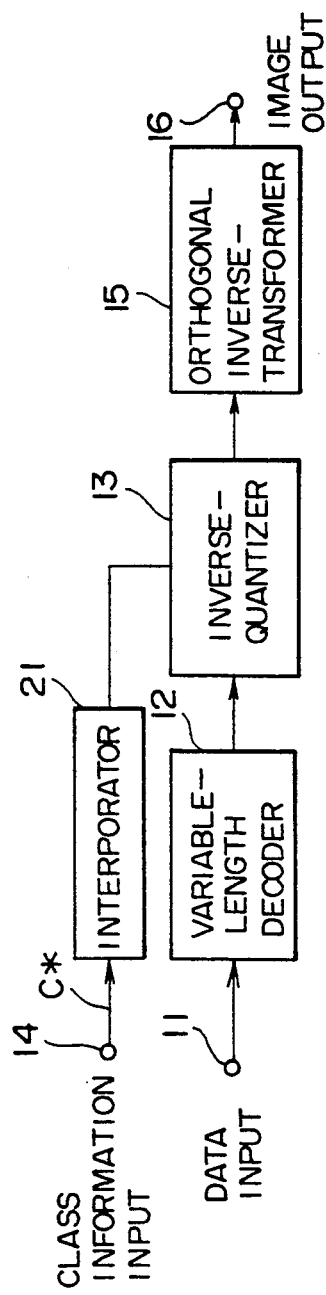

An image signal coding/decoding system according to a second embodiment of this invention will now be described with reference to FIGS. 9 and 10. FIG. 9 shows the outline of the configuration of an encoder of the system of the second embodiment and FIG. 10 shows the outline of the configuration of a decoder of the system of the second embodiment.

When attention is first drawn to the encoder of FIG. 9, this encoder mainly differs from the encoder of the first embodiment of FIG. 4 in that the processing in the LPF 18 is improved, and that an output signal from the LPF 18 is delivered to the class information output terminal 8 and an interpolation element (interpolator) 20 through a thinning element (thinner) 19 to deliver an output signal from the interpolator 20 to the adaptive quantizer 10. Only the difference therebetween will now be described.

The LPF 18 is of the same structure as that of the LPF 9 of FIG. 4, but a signal including eight kinds (3 bits) of class values $C^*$ combined is outputted from the LPF 18. This signals is delivered to the thinner 19.

The thinner 19 thins class values every other block in horizontal and vertical directions to transmit interpolated class values to the decoder side through the class information output terminal 8, and to deliver it also to the interpolator 20.

Since the class value is thinned every other block in horizontal and vertical directions, one class value will be transmitted with respect to the "16×16" pixels. Accordingly, class values equal to one fourth in the case of the "8×8" pixels are transmitted. Thus, a quantity of data transmitted is equal to three eighth of that in the prior art or in the first embodiment.

The interpolator 20 prepares, by interpolation, the class value $C^*$ of a thinned block by class values of the adjacent blocks. The interpolation is carried out in dependency upon the position of the block. Namely, in the case where the class value $C^*$ is present in upper and lower adjacent blocks or left and right blocks, interpolation is performed by adding one half of the class value of one block and one half of the class value of the other block. Further, in the case where the class value $C^*$ is present in four adjacent blocks obliquely positioned, interpolation is performed by adding to each other one fourth of the class values of respective four blocks. The coefficient of the interpolation filter in this case is equal to four times greater than that shown in FIG. 5.

In FIG. 10 showing a decoder of the second embodiment, the same reference numerals as those of FIG. 8 are attached to the same components as those of the decoder of the first embodiment, respectively, and the repetitive explanation will be omitted.

The decoder of the second embodiment is a decoder corresponding to the encoder in the case of thinning a class value of a specified block, shown in FIG. 9. This decoder differs from the decoder of FIG. 8 in that a class value $C^*$ inputted through the class information input terminal 14 is delivered to the inverse-quantizer 13 through an interpolator 21.

It is of course that the interpolator 21 performs an interpolating operation similar to that of the interpolator 20 shown in FIG. 9.

An image signal coding/decoding system according to a third embodiment of this invention will now be described with reference to FIGS. 11 to 14.

Figure 11:
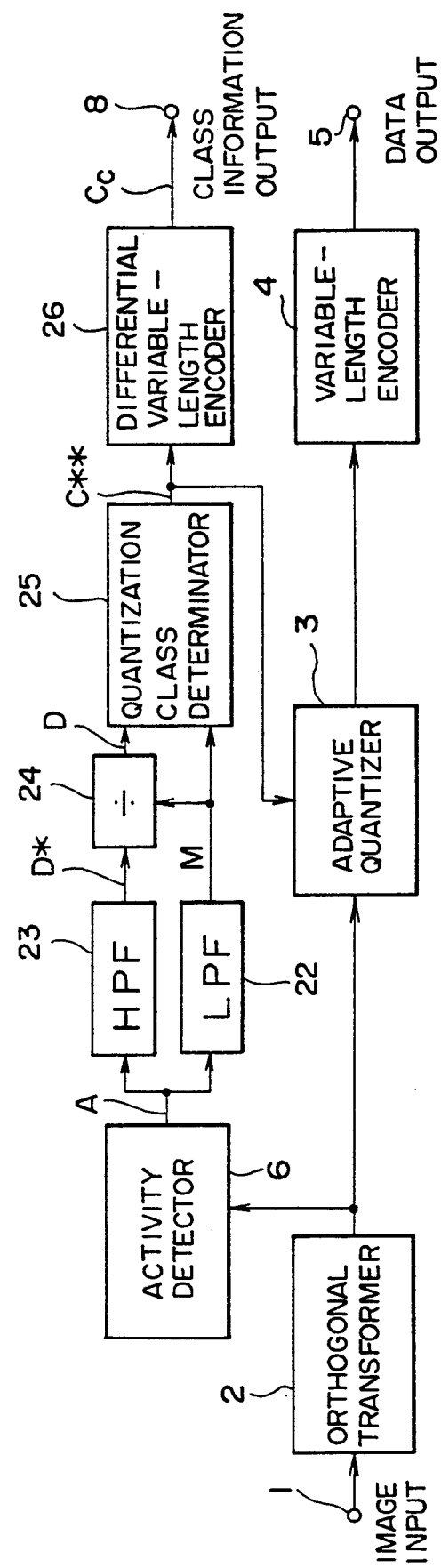
FIG. 11 is a block diagram showing the outline of the configuration of an encoder in an image signal coding/decoding system according to a third embodiment of this invention.

FIG. 11 is a block diagram showing the outline of the configuration of an encoder in a system according to a third embodiment of this invention. The decoder of the third embodiment differs from the encoders of the prior art and the first and second embodiments in the determination method. Namely, after the activity is passed through a low-pass filter (LPF) 22 and a high-pass filter (HPF) 23, it is delivered to a quantization class determinator 25. The operations of the orthogonal transformer 2, the adaptive quantizer 3, the variable-length encoder 4, and the activity detector 6 are the same as those of the prior art and the previously described embodiments.

An activity $\underline{A}$ of each block which is an output from the activity detector 6 is delivered to the LPF 22 and the HPF 23. The LPF 22 and the HPF 23 are a spatial filter wherein the processing for pixels by an ordinary LPF is replaced by the processing for the activity value every block. FIGS. 12(a) and (b) shown in a two-dimensional manner tap coefficients for respective blocks of the LPF 22 and the HPF 23, respectively. The center values corresponding to the block subject to the adaptive quantization are both $\frac{1}{2}$ (8/16). Furthermore, each peripheral value is 1/16 in the case of the LPF 22, and the peripheral value is $-1/16$ in the case of the HPF 23.

An output M from the LPF 22 is a mean value of an activity value of the object block and those of blocks in the vicinity therewith, and an output D* from the HPF 23 indicates the degree of the change in the activity relative to adjacent blocks.

An output M from the LPF 22 is inputted to a divider 24 and a quantization class determinator 25, and an output D* from the HPF 23 is delivered to the divider 24. At the divider 24, D*/M as a normalized change (difference) D is provided. The D*/M thus provided is inputted to the quantization class determinator 25. A quantization class C** which is an output from the quantization class determinator 25 is delivered to the adaptive quantizer 3, and is also delivered to a differential variable-length encoder 26.

The quantization class determinator 25 determines the quantization class C by the normalized change D and the output M from the LPF 22 on the basis of the characteristics as shown in FIG. 13. In this characteristic, the value of the normalized change D is caused to limitatively fall within the range of ±0.5, and the upper limit of the value of the output M from the LPF 22 is caused to limitatively fall within a predetermined range. The class C determined is divided into five stages of 0 to 4. Every time the class C** is incremented by one, the quantization step width Sq is increased 1.3 times.

As described above, the quantization class is determined by the mean component M of the activity and the change component D. The characteristic thereof will now be described. In the case where the change component D is fixed, according as the mean component M becomes small, the class becomes lower and the degree of the quantization becomes fine. On the other hand, in the case where the mean component M is fixed, according as the change component D becomes great, the class becomes low and the degree of the quantization becomes fine. Furthermore, according as the change component D becomes small, the class becomes high and the degree of the quantization becomes coarse. In the case where the value of the mean component M is positive, the object block has an activity higher than those of the peripheral blocks. This block portion corresponds to an object existing in an isolated manner on the flat background or the edge portion of a reproduced image. Since the quantization error is apt to visually become conspicuous at such a portion, it is desirable that the quantization is caused to be fine.

The quantization class C thus obtained is required to be transmitted to the decoder. At the differential variable length encoder 26, a difference between the class C earlier by one block and the class C** of the present block is calculated to encode that value by using the variable-length code as shown in TABLE 1 to output it as coded class information $C_c$ through the class information terminal 8.

TABLE 1

| C difference | Code |
| --- | --- |
| +4 | 11111 |

TABLE 1-continued

| C difference | Code |
| --- | --- |
| +3 | 11101 |
| +2 | 1101 |
| +1 | 101 |
| 0 | 0 |
| −1 | 100 |
| −2 | 1100 |
| −3 | 11100 |
| −4 | 11110 |

The example of how the variable length code is formed is shown in TABLE 2.

TABLE 2

| Class | 0 | 1 | 1 | 1 | 1 | 2 | 3 | 3 | 4 | 4 | 4 | 3 | 3 | 3 | 3 |
| --- | --- | --- | --- | --- | --- | --- | --- | --- | --- | --- | --- | --- | --- | --- | --- |
| Difference | 0 | +1 | 0 | 0 | 0 | +1 | +1 | 0 | +1 | 0 | 0 | −1 | 0 | 0 | 0 |
| Code | 0 | 101 | 0 | 0 | 0 | 101 | 101 | 0 | 101 | 0 | 0 | 100 | 0 | 0 | 0 |
| Class | 1 | 2 | 2 | 2 | 2 | 2 | 1 | 1 | 1 | 1 | 0 | 0 | 2 | 1 | 1 |
| Difference | −2 | +1 | 0 | 0 | 0 | 0 | −1 | 0 | 0 | 0 | −1 | 0 | +2 | −1 | 0 |
| Code | 1100 | 101 | 0 | 0 | 0 | 0 | 100 | 0 | 0 | 0 | 100 | 0 | 1100 | 100 | 0 |

As seen from the TABLE 2, although the kind of classes increases from 4 (prior art) to 5, the quantity of codes decreases. In the prior art, two bits per each block was required.

A decoder in a system of a third embodiment will now be described with reference to FIG. 14. In FIG. 14, compressed data transmitted from the data output terminal 5 of the encoder shown in FIG. 11 is delivered to the variable length decoder 12 through the data input terminal 11. This variable length decoder 12 converts the variable-length code to an ordinary code to deliver it to the inverse-quantizer 13.

On the other hand, an input signal of the coded class information $C_c$ outputted from the class information output terminal 8 of the encoder of FIG. 11 is delivered to the variable-length decoder 27 through the class information input terminal 14. This variable length decoder 27 converts the class information subjected to variable length encoding to a fixed length code to deliver it to the inverse-quantizer 13. The inverse-quantizer 13 replaces the ordinary code delivered from the variable-length decoder 12 by a representative value of quantization to deliver it to the orthogonal inverse-transformer 15. The step width for replacement of the representative value at the inverse-quantizer 13 is determined by the class value C** in the same manner as in the case of the adaptive quantizer 3 in the encoder.

The orthogonal inverse-transformer 15 carries out inverse-DCT transformation of an input signal to provide a reproduced image signal to output it through the image output terminal 16.

In accordance with the coding/decoding system according to the third embodiment, the quantization step at the edge portion of an image can be further fine. Particularly, the deterioration in the picture quality at the edge portion of a reproduced image of an isolated reproduced image can be prevented.

In addition, by changing class information for the adaptive quantization to that in the form of the variable length code, the quantity of data transmitted is reduced. Thus, more appropriate adaptive quantization can be carried out.

What is claimed is:

1. An encoder for dividing an image signal into several blocks having a predetermined number of pixels, for detecting an activity of each block in which activities indicate changes in said image signal in said block, for determining a class which directs a quantization step width in order to quantize said image signal in accordance with detection result, and for adaptively quantizing said image signal in accordance with a determination result; said encoder comprising:

class determination means for determining a class which directs a quantization step width that is determined in every block, in accordance with the detection results of said activities;

filter means for filtering said class values and class values in the peripheral blocks which are adjacent in upper, lower, right, left and oblique directions to an objective block;

quantization step determination means for determining a quantization step width for every block which are values obtained by filtering; and wherein said encoder outputs an encoded image signal which is quantized by a quantization step width determined by said quantization step determination means, and outputs information expressing the condition of said quantization, as supplemental information in order that a decoder may perform an inverse-quantization of said encoded image signal output therefrom.

2. The encoder according to claim 1, wherein said supplemental information corresponds to a class value which is obtained by said class determination means.

3. The encoder according to claim 1, further comprising thinner means for thinning block units of said class value after filtering by said filter means; and interpolation means for interpolating a class value of a thinned block in accordance with an output of said thinner means, thereby outputting an interpolated result to said quantization step determination means;

wherein supplemental information corresponds to said class value of said thinned block which is thinned by block unit and outputted from said thinner means.

4. An encoder for dividing an image signal into several blocks having a predetermined number of pixels, for detecting an activity of each block in which activities indicate changes in said image signal in said block, for determining a class which directs a quantization step width in order to quantize said image signal in accordance with a detection results, and for adaptively quantizing said image signal in accordance with a determination result, said encoder comprising;

change detection means for detecting changes of said activities of each block; and class determination means for directing a narrow step width with respect to a block having activities larger than peripheral blocks which are adjacent in upper, lower, right, left and oblique directions to an objective block, by determining said class value for directing a quantization step width in accordance with the detection results obtained by said change detection means; and wherein said encoder outputs an encoded image signal which is quantized by a quantization step, and outputs information with respect to a determined class, as supplemental information in order that a decoder may perform an inverse-quantization of said encoded image signal output therefrom.

5. The encoder according to claim 4;
wherein said supplemental information outputted therefrom is a signal in which a differential of the determined class values with respect to successive blocks is coded by a variable-length code.

6. A decoder for decoding an encoded signal by receiving supplemental information with respect to a determined class value and said encoded signal which is obtained in such a manner that there is detected activities which indicate a change ratio of an image signal in each block in which the image signal is divided into predetermined pixels; a class which directs a quantization step width being determined in every block is determined in accordance with a detected activity; a detected class value is filtered in an object block and peripheral blocks which are adjacent in upper, lower, right, left and oblique directions to the objective block to determine a quantization step width; and said encoded signal is encoded after being quantized by said quantization step width, said decoder comprising:

filter means for filtering said supplemental information in the objective block of said inverse-quantization and in the peripheral blocks.

7. The decoder according to claim 6, wherein said supplemental information corresponds to a class value of each block.

8. The decoder according to claim 6, wherein said supplemental information is a class value corresponding to remaining blocks which are left from thinning, and wherein said decoder further comprises interpolation means for interpolating and restoring a class value corresponding to lost blocks from said class value corresponding to said remaining blocks.

9. A decoder for restoring a quantization step width from a supplemental signal, which is used for coding an image signal, and for performing an inverse-quantization of a coded signal by using said quantization step width, after receiving said supplemental signal of a class value of each block and said coded signal;

wherein said class value of each block is determined to direct said quantization step width which is determined in every block on the basis of change between blocks of activity for indicating a change ratio of said image signal of each block in which the image signal is divided into a plurality of pixels; and said coded signal is quantized by a quantization step width of a block having large activity which is narrower than peripheral blocks which are adjacent in upper, lower, right, left and oblique directions to an objective block.

10. The decoder according to claim 9,
wherein said supplemental signal is encoded by a variable-length code from a differential between blocks of determined class value, and said decoder further comprises, variable-length decoding means for decoding said supplemental signal by said variable-length code, and inverse-quantization means for performing an inverse-quantization of said coded signal by using the same quantization step as that of quantization by restoring said class value by said variable-length decoding means.

11. The encoder according to claim 1,
wherein said supplemental information outputted therefrom, is a signal in which a differential of the informations expressing the condition of said quantization, with respect to successive blocks is coded by a variable-length code.

* * * * *